United States Patent [19]
Mattson et al.

[11] Patent Number: 5,406,090
[45] Date of Patent: Apr. 11, 1995

[54] SPECTROMETER AND IR SOURCE THEREFOR

[75] Inventors: David R. Mattson, Madison; Randolph W. Bach, McFarland; Scott A. Callaghan, Verona; Stephen C. Weibel, Madison, all of Wis.

[73] Assignee: Mattson Instruments, Inc., Madison, Wis.

[21] Appl. No.: 20,522

[22] Filed: Feb. 22, 1993

[51] Int. Cl.6 .................................................. H01K 1/02
[52] U.S. Cl. ......................... 250/504 R; 250/493.1; 356/346; 356/326
[58] Field of Search .......................... 356/346, 326; 250/504 R, 493.1

[56] References Cited

U.S. PATENT DOCUMENTS

| | | | |
|---|---|---|---|
| 4,254,337 | 3/1981 | Yasujima et al. | 250/339 |
| 4,447,153 | 5/1984 | Cremers et al. | 356/361 |
| 4,640,617 | 2/1987 | Hughes et al. | 356/346 |
| 4,810,092 | 3/1989 | Auth | 356/346 |
| 4,844,614 | 7/1989 | Henderson et al. | 356/346 |
| 4,935,633 | 6/1990 | Curbelo et al. | 250/504 R |
| 5,153,675 | 10/1992 | Beauchaine | 356/346 |
| 5,291,022 | 3/1994 | Drake et al. | 250/504 R |

*Primary Examiner*—Robert P. Limanek
*Assistant Examiner*—David B. Hardy
*Attorney, Agent, or Firm*—Emrich & Dithmar

[57] ABSTRACT

An interferometer including a beamsplitter and fixed and movable cube corner reflectors is adapted for use in a Fourier-transform infrared (FTIR) spectrometer. The spectrometer includes a cast metal base, such as of aluminum, with the interferometer including an IR source housing formed integrally with the base for dissipating heat via conduction. The IR source housing is hollow and open at the top for receiving a removable opaque printed circuit board (PCB) which is coupled to and provides support for and electrical current to an IR source within the housing. The housing includes two apertures in lateral portions thereof. An IR beam is directed by the source through a first aperture to the Michelson interferometer, while a second aperture is adapted to receive a fiber optic light guide to allow for direct viewing of the IR source in a safe manner without removing the PCB cover of the housing. An interferometer chamber is isolated from a sample chamber, both of which chambers may be independently purged and are further isolated from the spectrometer's electronic circuitry. The spectrometer includes a minimum number of reflectors outside of the interferometer for reduced light loss and improved signal-to-noise ratio with the interferometer providing an output IR beam to a first focus mirror which horizontally focuses the beam on and directs the beam through the sample and thence onto a second focus mirror which vertically focuses the beam on a closely spaced IR detector integrated in a printed circuit board.

23 Claims, 7 Drawing Sheets

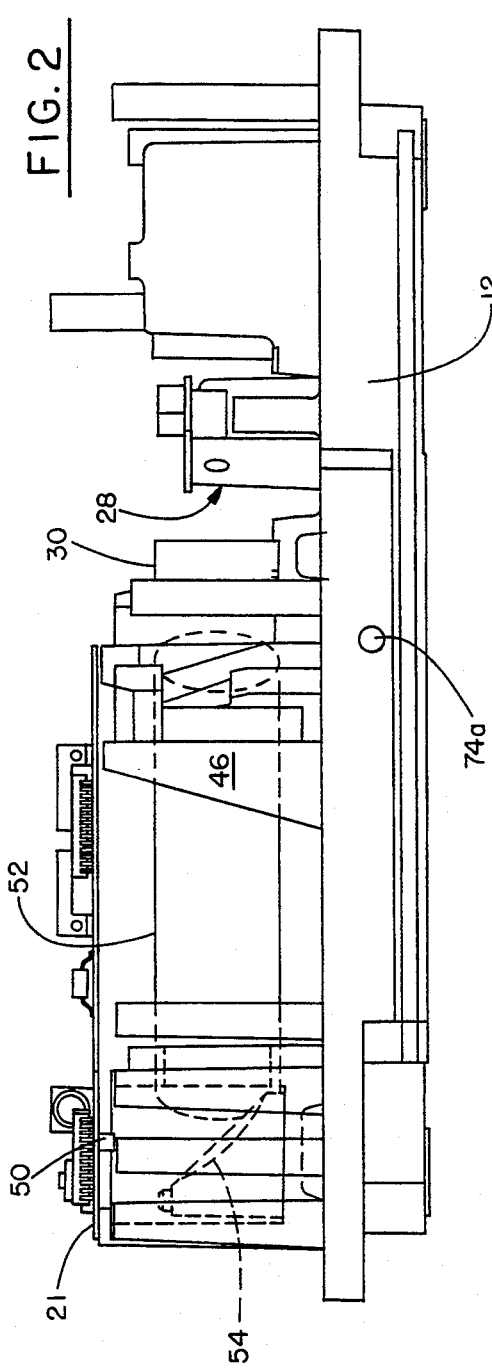
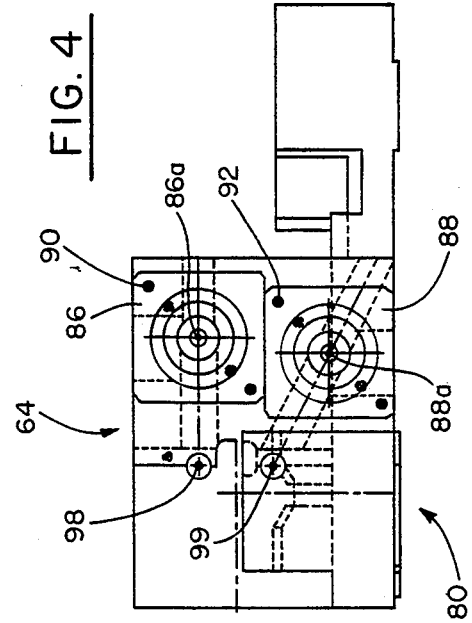
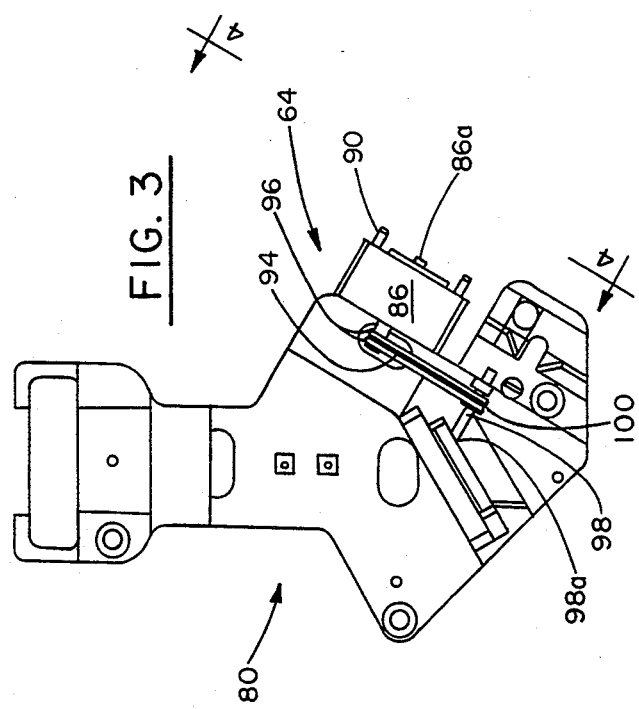

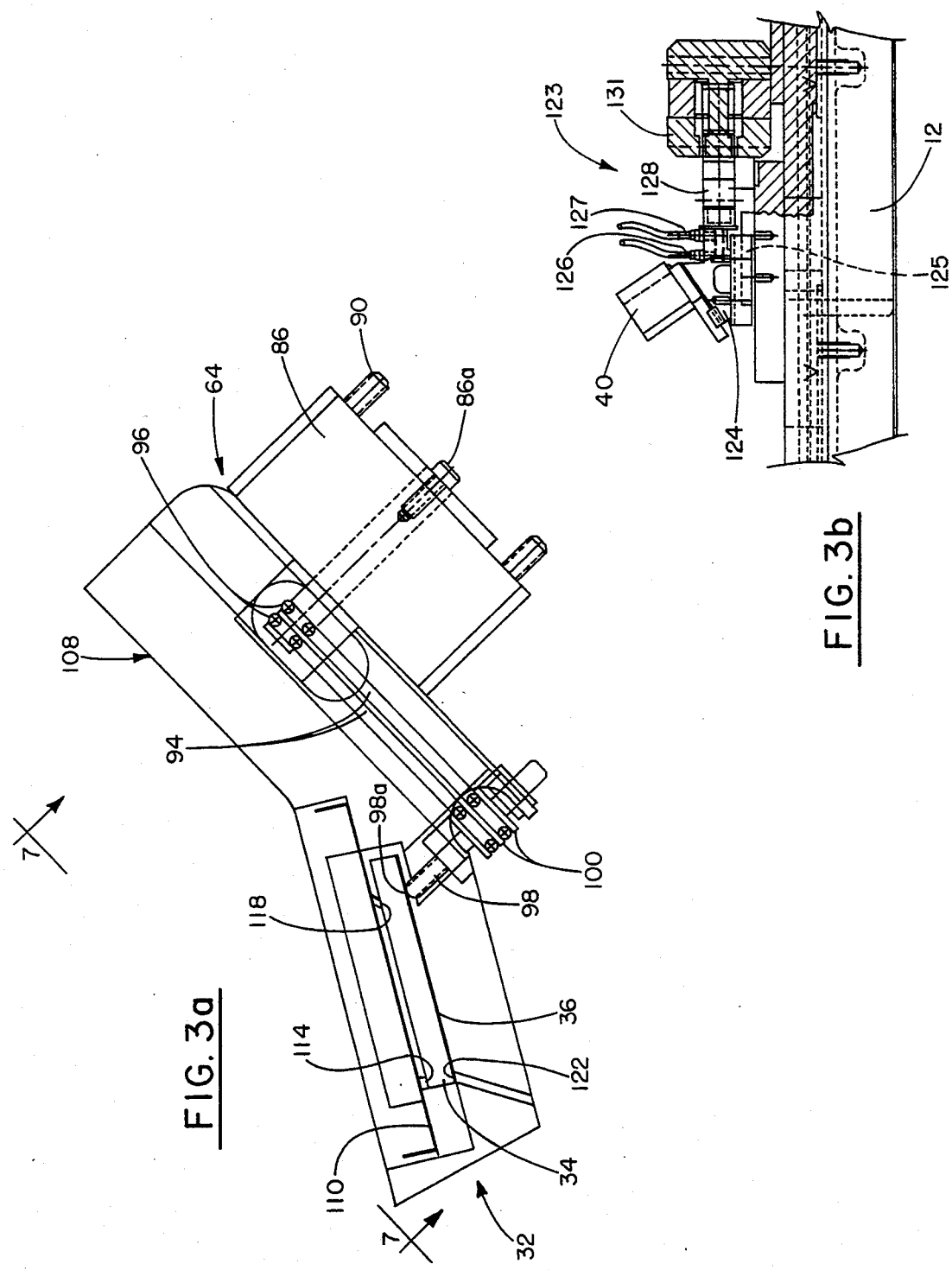

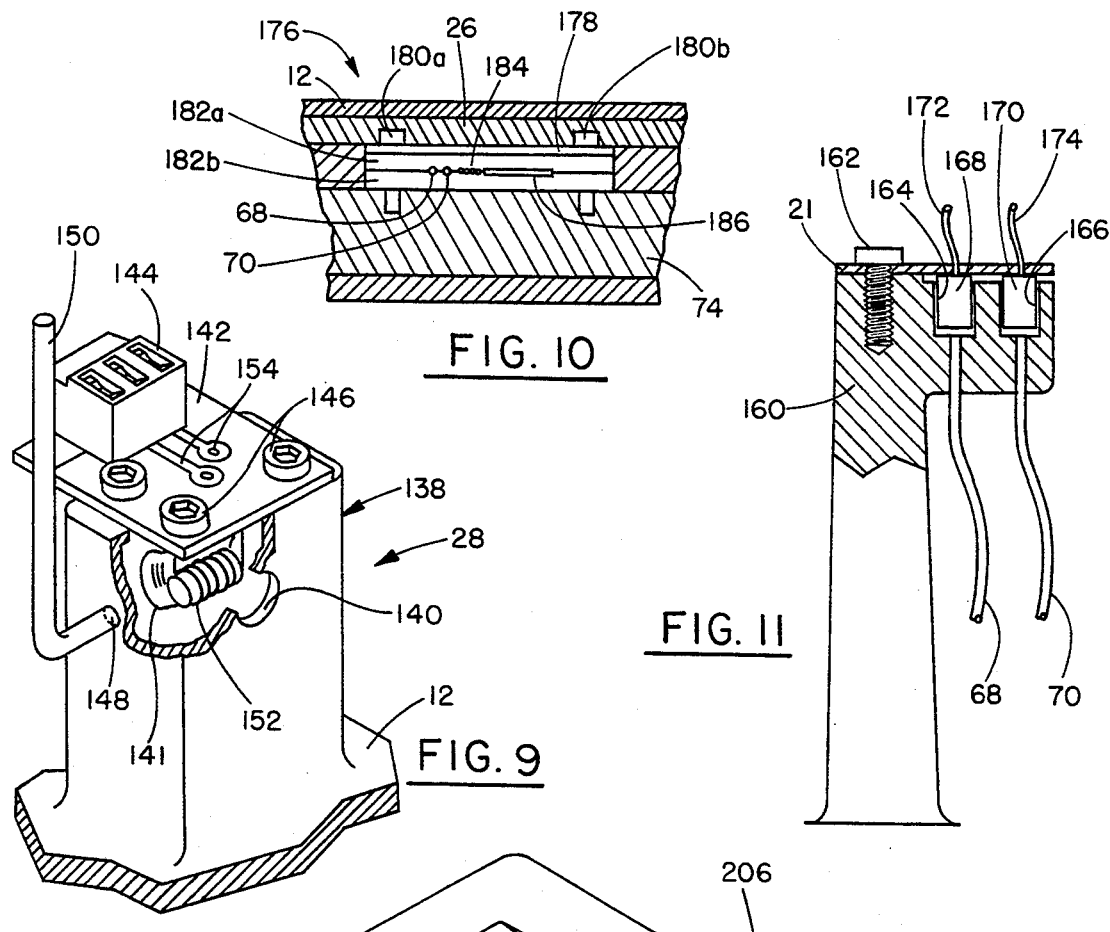
FIG. 10
FIG. 11
FIG. 9
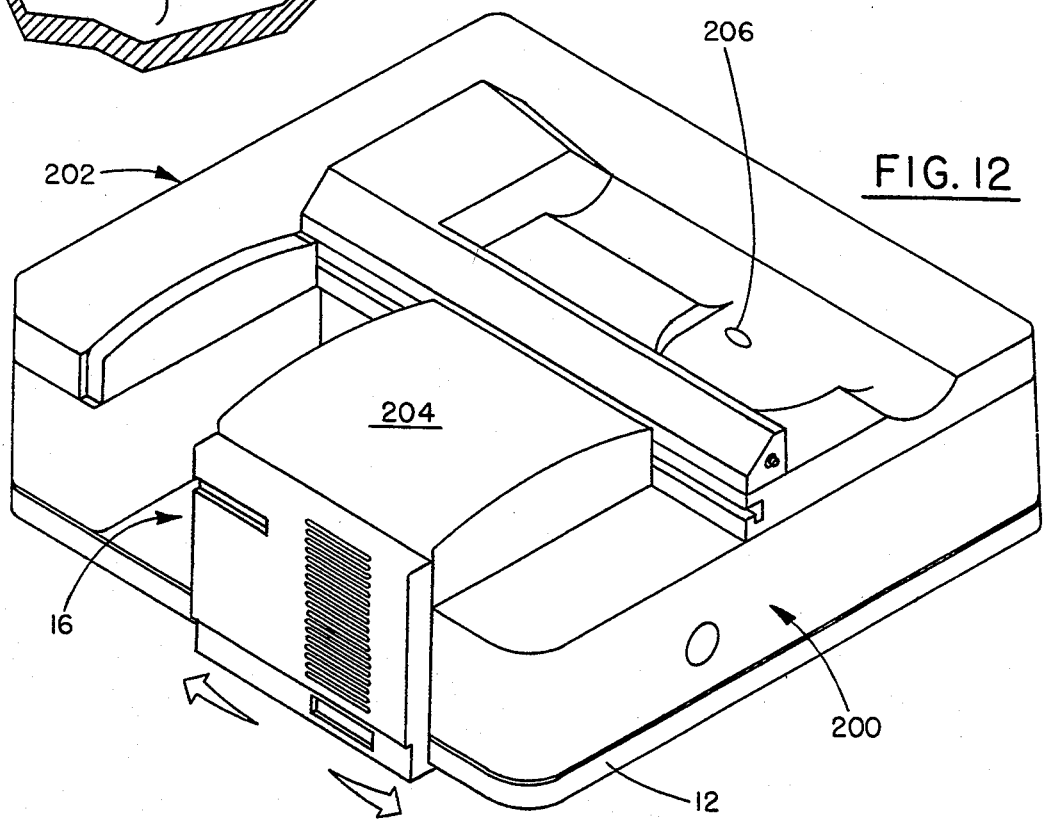
FIG. 12

SPECTROMETER AND IR SOURCE THEREFOR

FIELD OF THE INVENTION

This invention relates generally to apparatus for spectro-scopically analyzing a sample and is particularly directed to Fourier-transform infrared spectrometers and Michelson interferometers used therein for identifying the chemical composition of a sample.

BACKGROUND OF THE INVENTION

Fourier-transform infrared (FTIR) spectrometers are used in analyzing and identifying the chemical composition of a sample. FTIR spectrometers typically include a Michelson interferometer having a beamsplitter, a fixed mirror and a moving mirror. The beamsplitter divides an incident IR beam into two paths, one on the fixed mirror and the other on the movable mirror, and then recombines the two beams after a path difference has been introduced by the moving mirror. A condition is thus created under which interference between the beams can occur, giving rise to intensity variations of the beam emerging from the interferometer which can be measured as a function of path difference by a detector. Because of the effect of interference, the intensity of each beam passing to the detector and returning to the source depends on the difference in path of the beams in the two arms of the interferometer. The variation in intensity of the beams passing to the detector and returning to the source as a function of the path difference provides the spectral information in the spectrometer.

The output beam is focused upon and passed through (or is reflected from) a sample, after which the beam is collected and focused onto a detector. The detector provides a time varying output signal containing information concerning the wavelengths of IR absorbance, or specular reflectance, of the sample. Fourier analysis is performed on the output signal data to yield usable information on the chemical composition of the sample.

Prior art spectrometer and interferometer combinations have suffered from various limitations. For example, precise alignment of the beamsplitter and reflectors relative to the light beam is required. Misalignment of as small as 0.1 microns will give rise to spurious interference fringes and erroneous spectral data. Detection of erroneous spectral data typically leads the investigator to check out the entire spectrometer because minor alignment corrections are not available in most current spectrometers which incorporate automatic, computer controlled positioning of the reflecting mirrors. Some prior art spectrometers include an indicator light to alert a user to a failure of the light source (typically an infrared radiation source). Failure of the infrared (IR) source and a faulty indicator can result in the spectrometer user expending considerable time troubleshooting the system when all that is required is replacement of the IR source.

The position of the beamsplitter surface between the interferometer's substrate and compensator also renders it difficult to accurately position the beamsplitter surface with respect to the fixed and movable mirrors. Heat generated by the light source and spectrometer electronics also renders optical alignment more difficult. Prior approaches for dissipating the heat have included water cooled jackets or heat sink fins attached to the light source mount which add to the complexity and cost of the spectrometer. The water cooling approach also is subject to leakage with frequently catastrophic results. Stray light from the source which is not in the beam incident upon the sample also degrades spectrometer performance. It is therefore desirable to confine the light emitted by the light source to the beam incident upon the sample and to be able to verify light source operation without trouble shooting the entire spectrometer. Finally, prior art spectrometers have suffered from overly complex optical arrangements which have reduced detected signal sensitivity and have made it difficult to isolate the optics of the spectrometer from its electronics for improved optical performance.

OBJECTS AND SUMMARY OF THE INVENTION

The present invention addresses the aforementioned limitations of the prior art.

Accordingly, it is an object of the present invention to provide optical alignment in a Michelson interferometer by either electromechanical or manual positioning of the interferometer's beamsplitter.

Another object of the present invention to provide for precise optical alignment in a Michelson interferometer by means of a three point mount for the interferometer's beamsplitter, including a fixed point and two movable points each displaced by an ultrafine pitch screw either motor-driven or manually operated.

Yet another object of the present invention is to provide optical alignment in a Michelson interferometer by fixing the alignment between a fixed and a movable mirror attached to a common base and by directly referencing the position of the interferometer's beamsplitter to the mirrors via the base.

A further object of the present invention is to effectively dissipate heat of a light source in a spectrometer by conduction cooling without adversely affecting the spectrometer's optics.

A still further object of the present invention is to provide a housing for a light source in a spectrometer which minimizes stray light in the spectrometer while permitting easy repair or replacement of the light source.

It is another object of the present invention to verify light source operation in a spectrometer by permitting direct viewing of the light source by an operator in a safe manner.

Still another object of the present invention is to integrate an IR detector in IR signal detection and processing circuitry in a FTIR spectrometer for improved detected signal sensitivity.

Another object of the present invention is to position the optics of a spectrometer in a beam conforming, closed chamber for isolation from the spectrometer's electronics.

These objects of the present invention are achieved and the disadvantages of the prior art are eliminated by apparatus in accordance with one embodiment of the present invention for use in a Fourier transform infrared (IR) spectrometer having a cast metal base, with the apparatus providing an IR beam for spectroscopic analysis of a sample and comprising: a cast metal hollow housing extending upward from the base and formed integrally with the base for conducting heat into the base for dissipation, the housing having an open top portion and including a first aperture in a lateral portion thereof; a removable cover disposed over the open top portion of the hollow housing for preventing IR radiation from escaping therefrom; and an IR source disposed within the hollow housing, wherein the IR source is coupled to and supported by the removable cover for directing IR radiation out of the aperture in the hollow housing.

Another embodiment of the invention contemplates apparatus for supporting and positioning a beamsplitter with substrate in a Michelson interferometer having a base, wherein an incident light beam is divided into two paths with a first portion of the light beam directed onto a fixed reflector and a second portion of the light beam directed onto a movable reflector, with the first and second light beam portions then recombined to provide an output light beam, the apparatus comprising: a mounting fixture attached to the base, the fixture including a fixed pad for engaging a first surface of the beamsplitter; a retainer affixed to the mounting fixture and including spaced, first, second and third resilient positioning springs for engaging a second opposed surface of the beamsplitter, wherein the third positioning spring is disposed adjacent to the fixed pad with the beamsplitter positioned therebetween; and first and second movable members engaging the first surface of the beamsplitter adjacent to the first and second springs, respectively, for adjusting the position of the beamsplitter relative to the fixed and movable reflectors.

This-invention further contemplates apparatus for use in a Michelson interferometer for determining the position of the movable reflector, the apparatus comprising: a laser beam source for directing a laser beam onto the beamsplitter; first and second fiber optic leads each having respective first and second end portions, wherein the first end portions of each of the first and second fiber optic leads are disposed in the laser beam, with the laser beam transmitted within and along the length of each of the fiber optic leads; and first and second laser diode detectors respectively disposed adjacent to the second end portions of the first and second fiber optic leads and responsive to the laser beam transmitted therein for providing an indication of the position and direction of displacement of the movable reflector.

A further embodiment of this invention contemplates a Fourier transform infrared (IR) spectrometer wherein an IR beam is directed onto a sample for providing either a reflectance or absorbance spectrum of the sample, the spectrometer comprising: a closed interferometer chamber containing a Michelson interferometer; a closed sample compartment containing a sample being analyzed; electronic circuitry for energizing an IR source, providing an interference IR beam incident upon the sample, and detecting and processing an output IR beam containing the sample's spectrum, wherein the electronic circuitry is disposed outside of and is isolated from the interferometer chamber and the sample compartment; first purge arrangement coupled to the interferometer chamber for controlling the atmosphere therein; and second purge arrangement coupled to the sample compartment for controlling the atmosphere therein.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 2 is a side elevation view of the spectrometer shown in FIG. 1 taken along site line 2—2 therein;

FIG. 3 is a plan view of the interferometer optical mounting arrangement in the spectrometer of FIG. 1;

FIG. 3a is a plan view of the beamsplitter and beamsplitter positioning control mount employed in the interferometer optical mounting arrangement of FIG. 3;

FIG. 3b is a partial side elevation view of the spectrometer shown in FIG. 1 taken along sight line 3b—3b therein illustrating details of the movable cube corner reflector, or mirror, mounting arrangement;

FIG. 4 is a side elevation view of the interferometer optical mounting arrangement shown in FIG. 3 taken along site line 4—4 therein;

FIG. 9 is a partially cutaway perspective view of the IR source assembly of the spectrometer in accordance with one aspect of the present invention;

FIG. 10 is a sectional view taken along site line 10—10 in FIG. 1 illustrating details of the positioning of the interferometer chamber cover on the spectrometer's base in a sealed manner allowing for the routing of electrical and fiber optic leads into and out of the interferometer chamber;

FIG. 11 is an elevation view shown partially in section of a portion of the spectrometer's electronic circuitry illustrating the combination of fiber optic leads and diode detectors for providing laser reference signals relating to the position of the interferometer's movable mirror to the spectrometer's electronic circuitry; and FIG. 12 is a perspective view of a plastic cover for the inventive spectrometer of FIG. 1.

DETAILED DESCRIPTION OF THE PREFERRED EMBODIMENT

Figure 1:
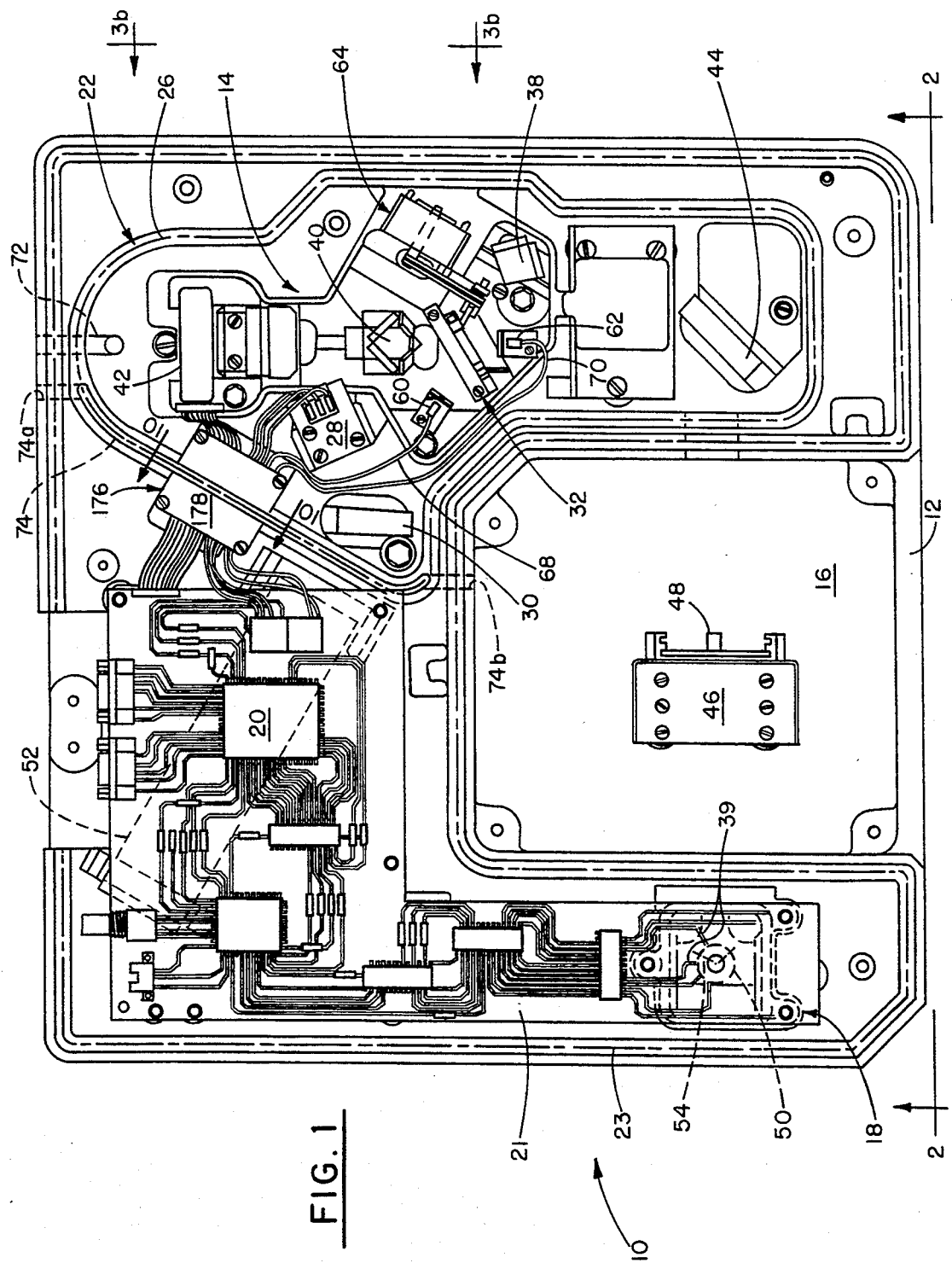
FIG. 1 is a plan view of a spectrometer in accordance with the present invention with the cover removed from the spectrometer meter base.

Referring to FIG. 1, there is shown a plan view of a spectrometer 10 in accordance with the principles of the present invention, with the spectrometer's cover (not shown) removed from its base 12. Reference is also made to the plan view of the spectrometer 10 shown in FIG. 1a which illustrates less detail of the spectrometer, but shows the IR beam path in the spectrometer. A side elevation view of the spectrometer 10 shown in FIG. 1 taken along site line 2—2 is shown in FIG. 2. The spectrometer's base 12 is preferably comprised of a cast metal such as aluminum. The upper surface of the spectrometer's base 12 is provided with a plurality of spaced apertures for attaching various spectrometer components to the base and further includes a plurality of spaced support bosses extending upward from the upper surface of the base for mounting one or more printed circuit boards (PCBs) to the base.

Spectrometer 10 includes a Michelson interferometer 14, a sample chamber 16, a detector chamber 18, and a printed circuit board (PCB) 21 containing conventional spectrometer electronics such as power supplies, signal processing circuitry, control circuitry, etc. PCB 21 is shown as including various discrete components, numerous wire routings, and several integrated circuits (ICs) including a computer IC 20 for controlling operation of the spectrometer in accordance with an operator's inputs.

Interferometer 14 includes a beamsplitter 32, a fixed position cube corner mirror 38, and a movable cube corner mirror 40. An IR source, described in detail below, in an IR source assembly 28 directs an IR beam 66 onto a collimating mirror 30. The IR beam reflected by collimating mirror 30 is directed through beamsplitter 32 onto the fixed position cube corner mirror 38. A portion of the IR beam directed onto the beamsplitter 32 is reflected by the beamsplitter to the movable cube corner mirror 40. Portions of the IR beam transmitted through and reflected by beamsplitter 32 are recombined at the beamsplitter and are directed as a collimated beam to a sample focus mirror 44. Mirror 44 focuses the IR beam on a sample holder 46 containing a sample under investigation. The sample is disposed within a sample chamber, or compartment, 16 and is maintained in position by means of a sample holder 46. After passing through the sample, the diverging IR beam is incident upon a detector mirror 54 which directs and focuses the IR beam onto an IR detector 50 coupled to and integrated with a printed circuit board (PCB) 21. Mirror 44 is disposed intermediate beamsplitter 32 and detector mirror 54 so as to form a field image of the beamsplitter at the detector mirror for optimum energy density at detector 50. Sample focus mirror 44 directs and focuses the IR beam generally horizontally, while detector mirror 54 directs and focuses the IR beam generally vertically onto detector 50. As shown in FIG. 1, IR detector 50 is directly coupled to a plurality of conductors 39 on PCB 21 and is not coupled to the IR signal processing circuitry via a separate preamplifier as in the prior art. Elimination of the separate IR detector preamplifier in the present invention substantially reduces noise in the detected signal processed by the circuitry on PCB 21 and increases the sensitivity of the spectrometer to the detected IR signal.

Referring to FIG. 9, there is shown a partially cutaway perspective view of the IR source assembly 28. IR source assembly 28 includes a hollow housing 138 formed integrally with and extending upward from base casting 12. With IR source housing 138 formed integrally with and as part of the same casting as base 12 and with the IR source housing and base casting both preferably comprised of a metal such as aluminum with a high heat conductivity, heat generated by an IR source within the IR source housing is removed by conduction by the IR source housing and is directed into the spectrometer's base for rapid and effective dissipation. As shown in the figure, IR source housing 138 is hollow and open at the top and includes first and second apertures 140 and 148 in respective sides thereof. IR source housing 138 is adapted to receive an IR element 152 coupled to and suspended from an IR source board 142 positioned over the open top of the housing. IR element 152 is typically a metallic or ceramic, or combination thereof, winding through which an electric current is passed for heating to temperatures on the order of 1100°–1700° C. Positioned adjacent to IR element 152 and forming an inner portion of the IR source housing 138 is an IR reflector 141 which directs IR radiation toward and through the first aperture 140. A portion of the IR radiation also exits the housing 138 via the second aperture 148. Inserted in the second aperture 148 and maintained in position such as by a friction fit is a rigid fiber optic light guide 150. IR radiation from the IR element 152 is transmitted by the rigid fiber optic light guide 150 to its distal end for safe viewing by a spectrometer user. Fiber optic light guide 150 is preferably a clad rod and allows the spectrometer user to visually determine whether the IR element 152 is operating properly or has failed. The fiber optic light guide 150 is aligned with an aperture in the spectrometer's cover, described below, to allow the spectrometer user to view the IR element 152 from outside of the spectrometer without interfering with the operation of the spectrometer. With IR radiation escaping from the source housing 138 only via first and second apertures 140 and 148, stray IR radiation within the spectrometer is minimized for improved optics operation and IR signal sensitivity.

The IR source board 142 is securely maintained in position on the upper end of the source housing 138 by means of a plurality of mounting screws 146. Disposed on the upper surface of the IR source board 142 are a pair of conductors 154 connected to respective ends of the IR element 152 through the source board. Conductors 154 are further coupled to a connector 144 for connecting the IR element 152 to a source of electric current (not shown). Mounting screws 146 facilitate removal of the IR element 152 from the IR source housing 138 for repair or replacement. The surface of IR reflector 141 facing the IR element 152 is polished to increase the amount of IR radiation directed through the first aperture 140 in the IR source housing 138.

Upon exiting the first aperture 140 in the IR source housing 138, the IR radiation is in the form of a beam directed onto collimating mirror 30. The IR beam is reflected by the collimating mirror 30 onto the beamsplitter 32 of interferometer 14.

Figure 6:
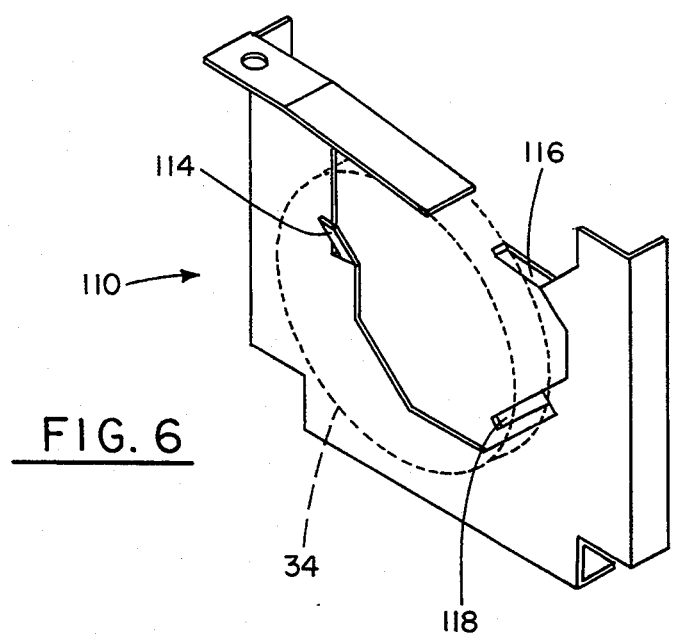
FIG. 6 is a perspective view of a beamsplitter retainer for maintaining the beamsplitter (shown in dotted-line form) in position in the interferometer.

Referring to FIG. 3, there is shown a plan view of an interferometer optical mounting arrangement 80 for use in interferometer 14. FIG. 3a is a plan view of a beamsplitter and beamsplitter positioning control mount for use in the optical mounting arrangement 80 of FIG. 3. FIG. 4 is a side elevation view of the interferometer optical mounting arrangement 80 shown in FIG. 3 taken along site line 4—4 therein. Beamsplitter 32 includes a substrate 34 having a partially reflecting surface 36 such as of germanium and is attached to and maintained in position by means of a beamsplitter mounting fixture 108. Also coupled to beamsplitter 32 is a beamsplitter positioning control 64 for precisely controlling the position and orientation of the beamsplitter relative to the IR beam and the fixed and movable cube corner mirrors 38 and 40 as described below. A beamsplitter retainer 110 preferably comprised of a thin metallic construction is securely attached to the beamsplitter mounting fixture 108 by screws (not shown) or other conventional coupling means. Beamsplitter retainer 110 includes first, second and third positioning springs 114, 116 and 118 disposed about an aperture through the retainer. Each of the positioning springs 114, 116 and 118 is adapted to engage a surface of a disc-like substrate 34 as shown in FIGS. 3a and 6. Substrate 34 is shown in dotted-line form in position relative to the beamsplitter retainer 110 in the perspective view of FIG. 6. Substrate 34 is thus positioned intermediate beamsplitter retainer 110 and the fixed position cube corner mirror 38.

Figure 7:
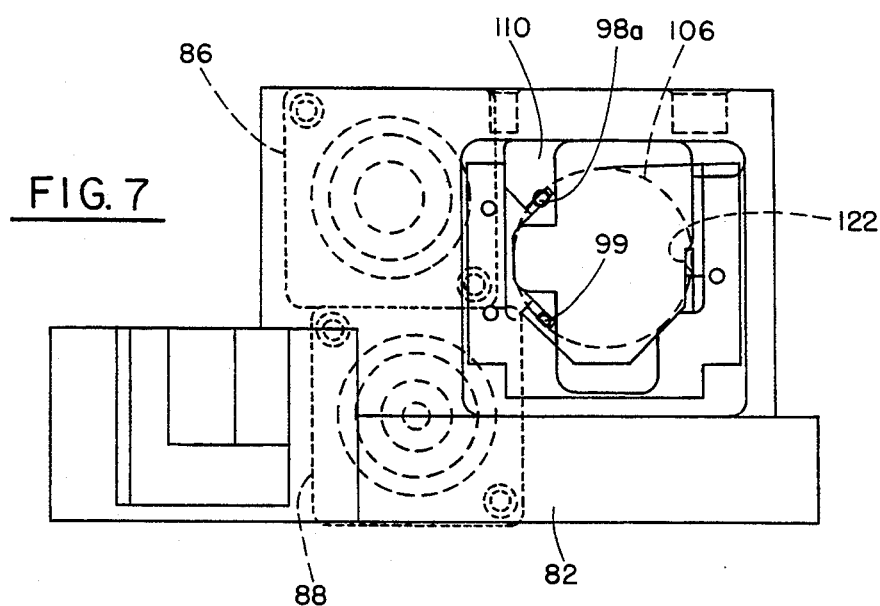
FIG. 7 is a side elevation view of the beamsplitter and beamsplitter positioning control mount shown in FIG. 3a taken along site line 7—7 therein.

With reference to FIG. 3a as well as to FIG. 7, which is a side elevation view of beamsplitter mounting fixture 108 taken along site line 7—7 in FIG. 3a, beamsplitter mounting fixture further includes a fixed pad 122 for engaging a second opposing surface of substrate 34 immediately adjacent to the first positioning spring 114 of beamsplitter retainer 110. Disposed on the second surface of substrate 34 is the aforementioned beamsplitter partial reflecting surface 36. Also engaging the second surface of beamsplitter 32 are upper and lower beamsplitter positioning screws 98 and 99. Upper beamsplitter positioning screw 98, which includes a rounded end 98a, engages the second surface of beamsplitter 32 adjacent to where the third positioning spring 118 engages the first surface of the beamsplitter. Similarly, lower beamsplitter positioning screw 99 which also includes a rounded end portion 99a engages the second surface of beamsplitter 32 adjacent to where the second positioning spring 116 engages the first surface of the beamsplitter substrate 34. The combination of the first positioning spring 114 and fixed pad 122 provides a first, fixed mount for beamsplitter 32.

Figure 5:
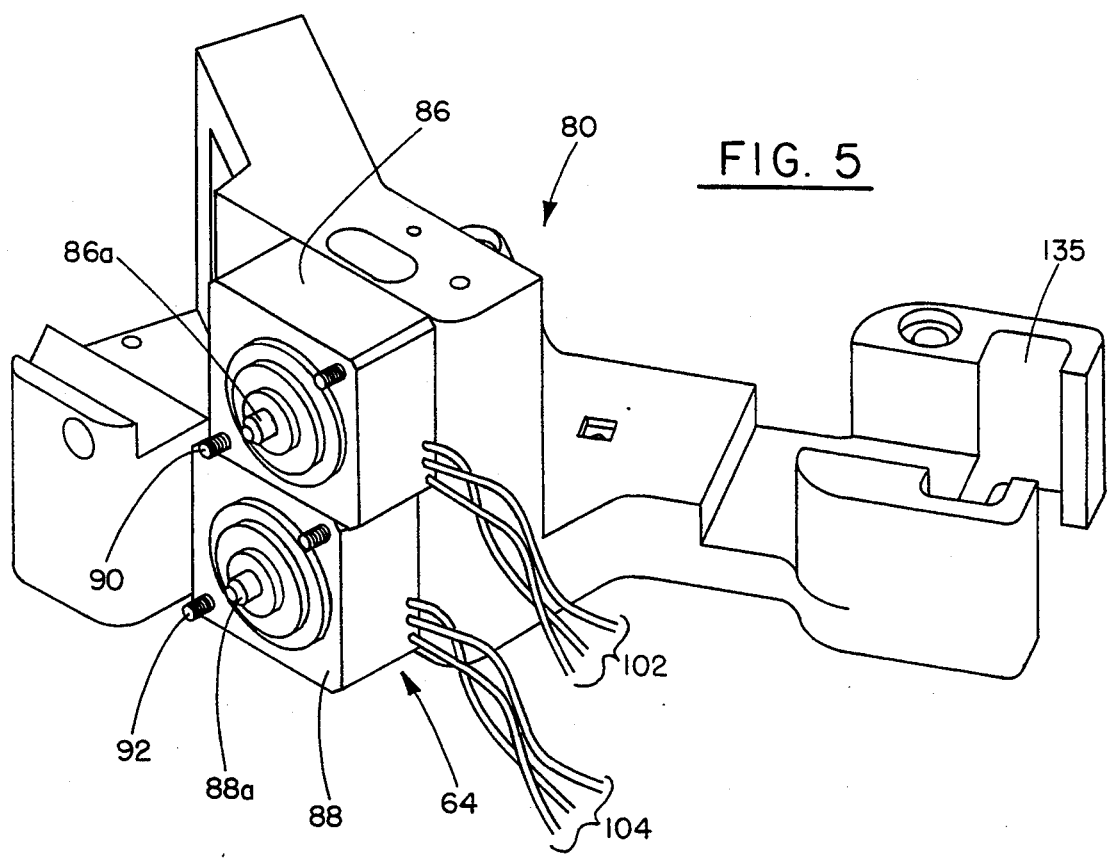
FIG. 5 is a perspective view of the interferometer optical mounting arrangement shown in FIG. 3.

Upper and lower beamsplitter positioning screws 98, 99 are disposed within parallel, spaced slots in the beamsplitter mounting fixture 108 and are freely rotatable therein. Upper beamsplitter positioning screw 98 is coupled to the drive shaft 86a of a first, upper motor 86 by means of the combination of a pair of endless drive belts 94, a pair of adjusting screw pulleys 100, and a pair of drive shaft pulleys 96. Lower beamsplitter positioning screw 99 is similarly coupled to the drive shaft 88a of a second, lower motor 88 by a similar combination of pulleys and endless drive belts which are not shown for simplicity. Each of the first and second motors 86, 88 is coupled to a suitable power source (not shown) by a respective plurality of conductors 102 and 104 shown in the perspective view of the interferometer optical mounting arrangement 80 of FIG. 5. Endless drive belts 94 are preferably rubber O-rings. Rotational displacement of the first and second drive shafts 86a, 88a results in a corresponding rotational displacement of the upper and lower beamsplitter positioning screws 98 and 99. Each of the beamsplitter positioning screws 98, 99 is provided with ultrafine pitch threads for engaging complementary threaded portions in the aforementioned spaced, aligned slots in beamsplitter mounting fixture 108. Rotational displacement of a positioning screw causes translational displacement along its longitudinal axis either toward or away from beamsplitter 32, depending upon the direction of rotation. In this manner, beamsplitter positioning screws 98 and 99 precisely position beamsplitter 32 relative to the IR beam and the fixed and movable cube corner mirrors 38, 40. Each of the first and second motors 86, 88 is securely attached to the beamsplitter mounting fixture 108 by means of respective pluralities of mounting screws 90 and 92 and is preferably an NMB stepper motor. In addition, the outer end of each of the first and second drive shafts 86a and 88a is adapted to receive a conventional tool such as a screwdriver or allen wrench for rotationally displacing the drive shaft and coupled adjusting screw for manual positioning of beamsplitter 32. This manual override feature permits a spectrometer user to precisely align the beamsplitter in the event the spectrometer automatic alignment system is not operating properly.

Figure 1A:
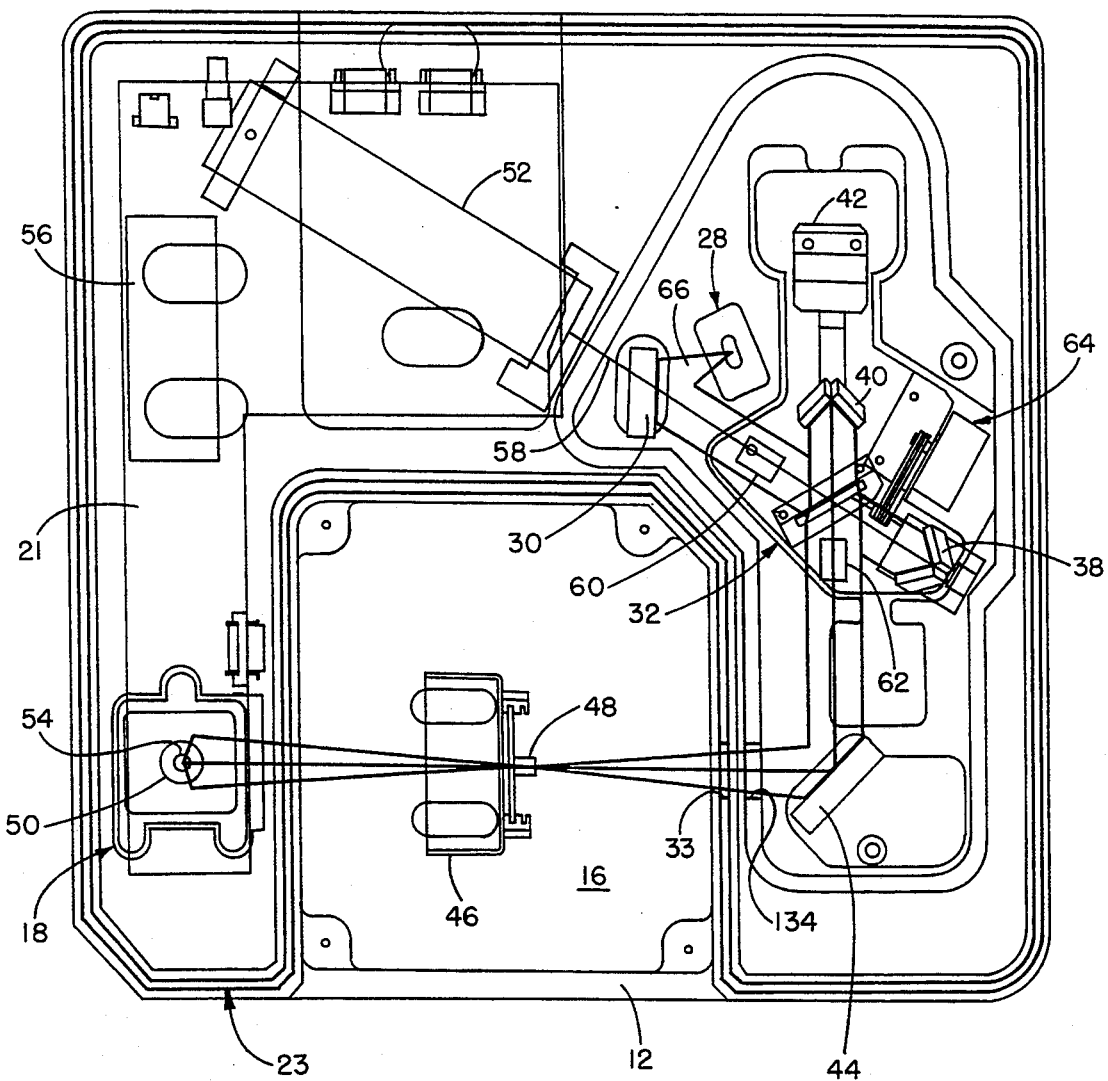
FIG. 1a is a plan view of the inventive spectrometer of FIG. 1 showing less detail of the spectrometer and illustrating the path of the IR beam therein.

Spectrometer 10 includes a laser 52 which is energized by a laser power supply 56 for directing a reference laser beam 58 through and off of beamsplitter 32 and onto the fixed and movable cube corner mirrors 38, 40 as shown in FIGS. 1 and 1a. Reference laser beam 58 operates as a position clock in providing a sine wave to determine zero crossing, or zero path difference (ZPD), between the fixed and movable cube corner mirrors 38, 40. The reference sine wave provided by the reference laser beam 58 is used to trigger IR signal detection and processing circuitry on PCB 21 for generating an interferogram of the sample under investigation. An accurate determination of the reference laser beam phase as the movable cube corner mirror 40 is displaced permits precise determination of movable cube corner mirror position for accurate sampling of the IR beam waveform at the IR detector 50. The fiber optics 68 of FIG. 11 fit into the fiber optic holders 60, 62.

In accordance with another aspect of the present invention, spectrometer 10 includes first and second fiber optic holders 60 and 62. The first fiber optic holder 60 is aligned with the laser beam 58 emitted directly from laser 52 and reflected from the fixed cube corner mirror 38, while the second fiber optic holder 62 is aligned with the portion of the laser beam transmitted through and reflected from beamsplitter 32 toward the sample focus mirror 44. The first fiber optic holder 60 includes a first fiber optic cable, or lead, 68 which is connected at its second end to a first recess 164 in a lower portion of PCB 21 as shown in the partial sectional view of FIG. 11. Similarly, the second fiber optic holder 62 includes a second fiber optic lead 70 having its second end inserted in a second recess 166 in a lower portion of PCB 21. Each of the fiber optic leads 68, 70 is inserted in a small aperture in a lower portion of a respective PCB recess 64, 66 and is maintained in position therein by means of a friction-fit. Positioned respectively within the first and second recesses 164, 166 are first and second photo-diode laser detectors 168 and 170. The first and second photo-diode laser detectors 168, 170 are, in turn, respectively coupled to appropriate circuitry on PCB 21 via leads 172 and 174 for processing the laser reference signal in determining the position of the movable cube corner mirror 40 for accurate sampling of the detected IR signal. Each of the first and second photo-diode laser detectors 168, 170 is responsive to a respective laser signal transmitted by the first and second fiber optic leads 68, 70 for providing a highly accurate determination of the position of the movable cube corner mirror 40. Two laser reference signals are provided in the spectrometer 10 via the first and second fiber optic leads 68, 70 in order to determine not only the position of the movable cube corner mirror 40, but also the direction in which it is being displaced. This laser quadrature detection arrangement permits precise sampling of the IR beam received by the IR detector 50. Replacement of the prior art remote photo diode detectors with the fiber optic leads 68, 70 in accordance with this aspect of the present invention increases spectrometer reliability while affording simplified construction and reduced cost. As shown in FIG. 11, PCB 21 is positioned upon and supported by a plurality of bosses 160, only one of which is shown in the figure for simplicity. Bosses 160 extend upward from the spectrometer's base casting 12. PCB 21 is securely attached to the support bosses 160 by means of a plurality of mounting screws 162.

Figure 8:
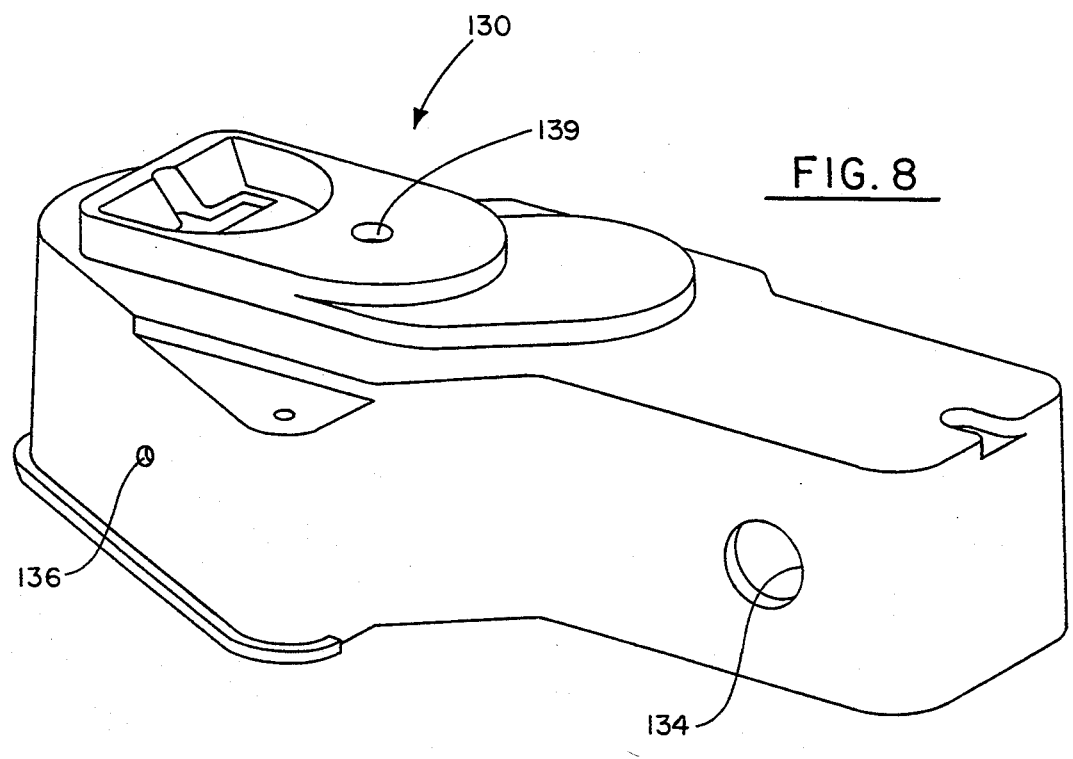
FIG. 8 is a perspective view of a plastic, transparent interferometer purge chamber cover used in the spectrometer of the present invention.

Referring to FIG. 10, there is shown a sectional view of the spectrometer shown in FIG. 1 taken along site line 10—10 therein. FIG. 10 illustrates the details of a sealed wire routing 176 for passing fiber optic leads as well as various electrical conductors from PCB 21 into the interferometer purge chamber 22 defined by a transparent interferometer purge chamber cover 130 shown in the perspective view of FIG. 8. Disposed in the upper surface of the spectrometer base casting 12 is a recessed groove into which the lower edge of the interferometer purge chamber cover 130 is inserted. Disposed within the recessed groove about the interferometer 14 and other optical elements is a gasket 26 which engages the lower edge of the interferometer purge chamber cover 130 when in position. In order to pass the first and second fiber optic cables 68, 70, a plurality of electrical conductors 184, and a ribbon cable 186 into and out of the interferometer purge chamber while maintaining the chamber sealed, the sealed wire routing 176 includes a generally flat steel cover plate 178 coupled to the base casting 12 by means of a plurality of mounting bolts, only two of which are shown in FIG. 10 as elements 180a and 180b. Positioned beneath the steel cover plate 178 and in engagement therewith is an upper gasket 182a. A lower gasket 182b is disposed below the upper gasket 182a and in contact with a lower portion of the base casting 12 above a purge channel 74 disposed within the base casting 12 and extending from an aperture 74a in the outer surface of the base casting to an inner aperture 74b in communication with the sample compartment 16. Fiber optic cables 68, 70, electrical leads 184 and ribbon cable 186 are disposed intermediate the upper and lower gaskets 182a and 182b. Steel cover plate 178 is urged downward by tightening of the mounting bolts 180a and 180b so as to compress the upper and lower gaskets 182a, 182b and maintain a tight seal about the fiber optic and electrical leads extending into the interferometer purge chamber 22 beneath the purge chamber cover 130. The sample compartment purge channel 74 extending from outer aperture 74a to inner aperture 74b within base casting 12 permits the sample compartment 16 to be purged in controlling the environment at the sample stop 48.

An interferometer purge channel 72 extends from an outer lateral surface of the base casting 12 into the interferometer purge chamber 22 to permit an inert gas to be directed into the interferometer purge chamber to provide a carefully controlled optical environment. The purge gas is vented through an aperture within the transparent interferometer purge chamber cover 130 which is preferably comprised of Lexan. The interferometer purge chamber cover 130 further includes a laser beam window 136, a desiccant cover mounting screw aperture 139, and an IR beam exit port 134 leading to the sample compartment 16.

Referring to FIG. 3b, there is shown a partial side elevation view of the spectrometer 10 shown in FIG. 1 taken along site line 3b—3b therein. FIG. 3b illustrates the details of the movable mirror mounting arrangement 123. The movable cube corner mirror 40 is positioned upon and supported by a mirror mount 124. Mirror mount 124 is positioned upon a linear bearing 125 shown in dotted-line form in the figure. Displacement of cube corner mirror 40 and mirror mount 124 along the linear bearing 125 is accomplished by means of a voice coil 128 such as used in a conventional loudspeaker which is coupled to the mirror mount. A current is provided to voice coil 128 via first and second lead and contact combinations 126 and 127. Changes in the magnetic field produced by a change in current through the coil 128 interacts with the field of a permanent magnet 131 giving rise to linear displacement of voice coil 128 and the combination of mirror mount 124 and the movable cube corner mirror 40 along linear bearing 125. A support arrangement 135 is provided for receiving and positioning a desiccant cartridge (not shown) within the interferometer purge chamber for removing moisture from the interferometer 14.

Referring to FIG. 12, there is shown a perspective view of a base cover 200 having a lift-off top cover 202, preferably comprised of plastic, for spectrometer 10. Top cover 202 is adapted for positioning on base cover 200 and includes an IR source viewing aperture 206 for viewing the IR source through the aforementioned rigid fiber optic light guide attached to the IR source housing. A sliding sample compartment door 204 attached to the base cover 200 permits easy access to the sample compartment 16. With the sliding sample compartment door 204 positioned over the sample compartment 16, the atmosphere within the sample compartment may be precisely controlled via the aforementioned sample compartment purge channel.

There has thus been shown a spectrometer and interferometer therefor which include various novel features and structures not available in the prior art. The FTIR spectrometer includes a cast metal base, such as of aluminum, having on its upper surface: a closed interferometer purge chamber, a purgable sample compartment, and IR signal detection and processing circuitry. Integral with and extending from the cast metal base is an IR source housing for dissipating IR source heat via conduction. Optical alignment is accomplished by moving the Michelson interferometer's beamsplitter relative to fixed and movable cube corner mirrors. The beamsplitter is engaged and displaced by a pair of motor driven screws with ultrafine pitch threads for precise positioning either automatically or manually. Fiber optic leads are used to provide a quadrature reference laser beam for precise positioning of the movable cube corner mirror and accurate sampling of the detected IR beam. An interferometer chamber is isolated from a sample chamber, both of which chambers may be independently purged, with both chambers further isolated from the spectrometer's electronic circuitry. The spectrometer includes a minimum number of reflectors cooperating with the interferometer and provides an output IR beam to a first focus mirror which horizontally focuses the beam on and directs the beam through the sample and thence onto a second focus mirror which vertically focuses the beam on a closely spaced IR detector integrated in a printed circuit board for improved IR signal detection.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. For use in a Fourier transform infrared (IR) spectrometer having a cast metal base, apparatus for providing an IR beam for spectroscopic analysis of a sample comprising:

a cast metal hollow housing extending upward from the base and formed integrally with the base for conducting heat into the base for dissipation, said housing having an open top portion and including a first aperture in a lateral portion thereof;

a removable cover disposed over the open top portion of said hollow housing for preventing IR radiation from escaping therefrom, wherein said removable cover includes an opaque printed circuit board (PCB) having a plurality of electrical conductors thereon; and an IR source disposed within said hollow housing, wherein said IR source is coupled to and supported by said removable cover for directing IR radiation out of the aperture in said hollow housing, and wherein said IR source is further coupled to said PCB for heating said IR source via an electrical current.

2. The apparatus of claim 1 wherein said cast metal base and hollow housing are comprised of aluminum.

3. The apparatus of claim 1 further comprising means disposed within said housing adjacent to said IR source for directing IR radiation emitted by said IR source toward said first aperture.

4. The apparatus of claim 3 wherein said means for directing IR radiation toward said aperture includes a polished reflector.

5. The apparatus of claim 1 further comprising an electrical connector attached to an upper surface of said PCB and coupled to said conductors for connecting an electrical current source to said IR source.

6. The apparatus of claim 1 further comprising coupling means for securely attaching said cover to said housing in a removable manner.

7. The apparatus of claim 6 wherein said coupling means includes at least one mounting screw inserted through said cover and into said housing.

8. The apparatus of claim 1 wherein said IR source includes a coiled metallic or ceramic conductor.

9. The apparatus of claim 1 further comprising optical means coupled to said housing for directly viewing said IR source.

10. The apparatus of claim 9 wherein said optical means includes a fiber optic light guide.

11. The apparatus of claim 9 wherein said housing includes a second aperture in a lateral portion thereof and wherein a first end of said fiber optic light guide is inserted in said second aperture for directly viewing said IR source.

12. The apparatus of claim 11 further comprising coupling means for maintaining the first end of said fiber optic light guide in said second aperture via a friction fit.

13. The apparatus of claim 12 wherein said spectrometer includes a cover disposed on said base, and wherein said cover includes an aperture aligned with a second end of said fiber optic light guide for directly viewing said IR source without removing said cover.

14. For use in a Fourier transform infrared (IR) spectrometer having a cast metal base, apparatus for providing an IR beam for spectroscopic analysis of a sample comprising:

a cast metal hollow housing extending upward from the base and formed integrally with the base for conducting heat into the base for dissipation, said housing having an open top portion and including first and second apertures in lateral portions thereof;

a removable cover disposed over the open top portion of said hollow housing for preventing IR radiation from escaping therefrom, wherein said removable cover includes an opaque printed circuit board having a plurality of electrical conductors thereon;

an IR source disposed within said hollow housing, wherein said IR source is coupled to and supported by said removable cover for directing IR radiation out of said first aperture in said hollow housing, and wherein said IR source is further coupled to said printed circuit board for heating said IR source via an electrical current;

a rigid fiber optic light guide having first and second opposed ends, wherein a first end of said fiber optic light guide is inserted in said second aperture of said housing to permit direct viewing of said IR source at the second end of said fiber optic light guide.

15. A Fourier transform infrared (IR) spectrometer wherein an IR beam is directed onto a sample for providing either a reflectance or absorbance spectrum of the sample, said spectrometer comprising:

a cast metal base;

a closed interferometer chamber disposed on said upper surface of said base and containing a Michelson interferometer and having a first atmosphere therein;

a closed sample compartment disposed on an upper surface of said base and containing a sample being analyzed and having a second atmosphere therein;

electronic circuitry for energizing an IR source, providing an interference IR beam incident upon the sample, and detecting and processing an output IR beam containing the sample's spectrum, wherein said electronic circuitry is disposed outside of and is isolated from said interferometer chamber and said sample compartment;

first purge means coupled to said interferometer chamber for controlling the first atmosphere therein, wherein said first purge means includes a first purge channel disposed in said base and extending from an outer lateral portion of said base into said interferometer chamber; and second purge means coupled to said sample compartment for controlling the second atmosphere therein.

16. The spectrometer of claim 15 wherein said second purge means includes a second purge channel disposed in said base and extending from an outer lateral portion of said base into said sample compartment.

17. The spectrometer of claim 15 wherein said interferometer chamber includes a removable cover disposed in sealed contact with the upper surface of said base.

18. The interferometer of claim 17 wherein said cover is comprised of transparent plastic.

19. The apparatus of claim 17 further comprising a first gasket disposed on the upper surface of said base and in sealed contact with a lower edge of said removable cover.

20. The spectrometer of claim 17 further comprising an opaque upper housing disposed on said base and over said removable cover and including said sample compartment.

21. The spectrometer of claim 20 wherein said upper housing includes a sliding panel disposed over said sample compartment for providing access to the sample.

22. The spectrometer of claim 21 further comprising a second gasket disposed on the upper surface of said base and in sealed contact with a lower edge of said upper housing.

23. The apparatus of claim 22 further comprising a sealed wire routing arrangement disposed intermediate a lower edge of said removable cover and the upper surface of said base for passing electrical leads into and out of said interferometer chamber in a sealed manner.

* * * * *